United States Patent [19]

McVie et al.

[11] Patent Number: 4,521,461

[45] Date of Patent: Jun. 4, 1985

[54] SILOXANE-POLYESTER COMPOSITIONS

[75] Inventors: James McVie; Derek W. Butler, both of Barry, Wales

[73] Assignee: Dow Corning Limited, Barry, Wales

[21] Appl. No.: 603,796

[22] Filed: Apr. 25, 1984

[51] Int. Cl.$^3$ .............................................. B05D 3/02
[52] U.S. Cl. .................................. 427/387; 524/759; 524/761; 525/446
[58] Field of Search ............... 525/446; 524/759, 761; 427/387

[56] References Cited

U.S. PATENT DOCUMENTS

| | | | |
|---|---|---|---|
| 3,701,815 | 10/1972 | Matzner et al. | 525/446 |
| 3,749,757 | 7/1973 | Marzocchi | 525/446 |
| 4,368,294 | 1/1983 | Deubzer et al. | 525/446 |

*Primary Examiner*—Melvyn I. Marquis
*Attorney, Agent, or Firm*—Robert L. McKellar

[57] ABSTRACT

Siloxane-polyester compositions comprising (1) a siloxane-polyester copolymer resin (2) one or more solvents for the siloxane-polyester copolymer, (3) a silane wherein one of the groups attached to silicon is an epoxy-substituted organic group, at least two of the remaining valencies of the silicon atom being satisfied by alkoxy or alkoxyalkoxy groups, and (4) a titanium chelate.

The presence of (3) and (4) improves the rate of cure of the siloxane-polyester, and the compositions are useful for providing decorative and/or protective coatings on metals, plastics and other substrates.

5 Claims, No Drawings

SILOXANE-POLYESTER COMPOSITIONS

This invention relates to compositions comprising siloxane-polyester copolymers and to the use of such compositions for coating substrates.

Compositions based on copolymerisation products of silicones and polyesters have been known and used for many years. Such silicone-polyesters have found application mainly in coating compositions, particularly in protective and decorative paints for metals such as mild steel and aluminium. Although compositions based on silicone-polyester copolymers are relatively successful from a commercial and technical standpoint they require baking for long periods (e.g. 1–2 hours) and/or at high temperatures (e.g., 250° C.) in order to achieve a cured coating having optimum hardness and abrasion resistance. There has thus existed a need for improved silicone-polyester compositions which can be cured employing milder conditions without sacrificing the desired properties in the cured coating.

In our European Patent Application No. 100623 there are described and claimed siloxane-polyester compositions comprising (1) a siloxane-polyester copolymer resin, (2) one or more solvents for the copolymer resin, (3) a silane having a silicon-bonded amino group and silicon-bonded alkoxy or alkoxyalkoxy groups and (4) a titanium chelate. Such compositions can be cured at relatively low temperatures and in a relatively short time e.g. 150° C. for 30 minutes. However, they suffer from the drawback that yellowing of the cured film can occur under certain conditions.

According to this invention there is provided a composition which comprises (1) a siloxane-polyester copolymer resin having on average at least two $\equiv$SiOM and/or $\equiv$COH groups per molecule, wherein M represents H or an alkyl group having from 1 to 4 carbon atoms, (2) one or more solvents for the silicone-polyester copolymer, (3) a silane of the general formula

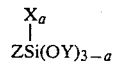

wherein Z represents an organic group composed of carbon, hydrogen and oxygen having therein at least one group of the formula

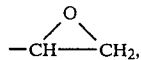

X represents a methyl or a phenyl group, Y represents an alkyl or an alkoxyalkyl group having less than 5 carbon atoms and a has a value of 0 or 1 and (4) a titanium chelate which is a dialkoxytitanium bis-(acetylacetonate) and/or a dialkoxytitanium bis-(ethylacetoacetate).

The siloxane-polyesters (1) employed in the production of the compositions of this invention can be prepared by known procedures. They are generally prepared by preforming the siloxane and polyester precursors and thereafter heating these together in the presence of a suitable solvent. As the siloxane precursor there can be used low molecular weight organosiloxanes having silicon-bonded groups reactive with the hydroxyl groups in the polyester precursor. The organic groups in the siloxane are usually lower alkyl e.g. methyl, ethyl and propyl, or phenyl, or mixtures of such groups, preferably methyl and phenyl. The reactive groups in the siloxane are generally hydroxyl, alkoxy or alkoxyalkoxy e.g. methoxy, ethoxy, propoxy and methoxyethoxy. Such organosiloxane precursors are well known and a number are commercially available. They include for example alkoxylated polymers of monophenylsiloxane units, alkoxylated copolymers of monophenylsiloxane and dimethylsiloxane units, alkoxylated copolymers of phenylmethylsiloxane and monomethylsiloxane units, alkoxylated copolymers of phenylmethylsiloxane and monophenylsiloxane units, hydroxylated copolymers of phenylmethylsiloxane and monoethylsiloxane units and hydroxylated copolymers of monophenylsiloxane and monopropylsiloxane units. The siloxane polymer and copolymer precursors can be prepared by known procedures, for example by the hydrolysis and cohydrolysis of the corresponding alkoxysilanes and condensation of the hydrolysis product.

The hydroxyl-containing polyesters which are reacted with the siloxane precursor are also well known materials. They can be obtained by the reaction of one or more aromatic dicarboxylic acids, normally phthalic acid, isophthalic acid or terephthalic acid, or esters and anhydrides thereof with one or more dihydric or polyhydric alcohols having from 2 to 8 carbon atoms, for example ethylene glycol, 1,2-propylene glycol, glycerol, trimethylpropane, trimethylolethane, pentaerytthritol and cyclohexane-dimethanol. If desired a saturated aliphatic dicarboxylic acid may be incorporated into the polyester although such addition is kept to a minimum where maximum hardness in the copolymer is required.

During the preparation of the siloxane-polyester the reaction may be expedited by the inclusion of a catalyst such as butyl titanate or propyl zirconate. In order to provide for the presence of residual $\equiv$SiOH and/or $\equiv$COH groups in the siloxane-polyester the reaction between the siloxane and polyester reactants should be only carried so far as is consistent with providing the desired proportion of these groups in the copolymer. It is preferred to employ a solvent for the reaction, some of which at least can remain as the, or as part of the, solvent (2) for the siloxane-polyester. The ratios of siloxane and polyester precursors employed in the preparation of the siloxane-polyester will depend upon the balance of properties desired in the copolymer. For example, the copolymer can be prepared employing 15–80% by weight of siloxane and 85–20% by weight of polyester. In general, however, the preferred copolymers are those comprising 35–80% by weight of siloxane and 65–20% by weight of polyester. Examples of siloxane-polyesters which may be employed as ingredient (1) of the compositions of this invention and methods for their preparation are described in U.K. Pat. Nos. 815,107, 1,070,174, 1,346,864 and 1,485,368.

The compositions of this invention contain one or more solvents (2) for the siloxane-polyester. Examples of solvents which can be employed are xylene, toluene, benzene, alcohols e.g. isopropanol and n-butanol, the ethers and esters of ethylene glycol, for example ethylene glycol monoethyl ether, ethylene glycol dimethyl ether, ethylene glycol monoethylether acetate and diethylene glycol monoethylether acetate; the preferred solvents being the lower monohydric alcohols, i.e. those having less than about 6 carbon atoms, and the ethers of the ethylene and propylene glycols. The proportion of solvent employed is not critical and will depend upon the intended use of the compositions. Where very thin coatings are desired the solvent may comprise the major proportion of the weight of the composition, for example up to about 85% by weight. Lower proportions of solvent e.g. down to about 20% may be employed where the application calls for a thicker deposition of silicone-polyester.

Ingredient (3) of the compositions of this invention is a silane having both a silicon-bonded epoxy-containing group and two or three silicon-bonded alkoxy and/or alkoxyalkoxy groups. In the general formula of the silanes (3) the substituent Z is any epoxidised monovalent organic group composed of carbon, hydrogen and oxygen. Such groups include those represented by the general formula

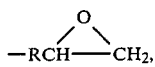

wherein R represents a divalent group e.g. —CH$_2$CH$_2$—, —(CH$_2$)$_3$—, —CH$_2$CH.CH$_3$CH$_2$—, phenylene, cyclohexylene and

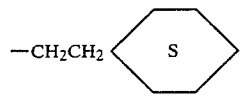

or an ether oxygen-containing group such as —CH$_2$CH$_2$OCH$_2$CH$_2$— and CH$_2$CH$_2$OCH(CH$_3$)CH$_2$—. Preferably Z represents the group

The group Y represents, for example, methyl, ethyl or methoxyethyl. Preferred as ingredient (3) are compounds represented by the formula

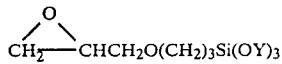

wherein each Y represents methyl, ethyl or methoxyethyl. The silane (3) may be employed in a proportion of from about 3% to about 25%, preferably 5% to 10% by weight based on the weight of the silicone-polyester.

The remaining essential ingredient of the composition is the titanium chelate (4). This may be any dialkoxytitanium bis-(acetylacetonate) or dialkoxytitanium bis-(ethylacetoacetate), the preferred chelates being those wherein the alkoxy groups are isopropoxy and/or ethoxy. From about 7.5% to about 25% by weight of the titanium chelate, based on the weight of silicone-polyester, are preferably employed. More than 25% by weight of the chelate can be used but no significant further advantage is believed to accrue from the use of such increased proportions.

Preparation of the compositions of this invention is carried out by mixing the ingredients (1) to (4). They may be mixed in any order. In practice the siloxane-polyester copolymer is normally prepared as a solution in one or more organic solvents. In accordance with conventional techniques the solvent content of the solution may be adjusted to the desired level during or following the preparation of the copolymer by the removal or addition of solvent, including the replacement or partial replacement of the original solvent with other solvents. For best results it is preferred that all of ingredients (1) to (4) are not brought together until the composition is required for use. Thus the solvent solution of the silicone-polyester, the silane and the titanium chelate may be packaged separately for storage and shipment and mixed in the desired proportions for use. Or, more conveniently, the composition can be provided as a two package product, the one package comprising the organic solvent solution of the siloxane-polyester copolymer and the other a mixture of the silane (3) and the chelate (4).

If desired, the incorporation of the silane (3) and the titanium chelate (4) with the silicone-polyester may be facilitated by the use of a diluent for each of (3) and (4).

The compositions of this invention are particularly adapted for the formation of protective and decorative coatings on metals e.g. steel, aluminium and copper, plastics e.g. acrylics and polycarbonates, and other substrates, to which they may be applied employing any appropriate technique, for example brushing, spraying, dip coating, roller coating and flow coating. They may be employed as clear coating materials or may be dyed or pigmented to any desired colour. Thin films of the composition may be cured to hard, adherent abrasion resistant coatings at temperatures as low as about 150° C., whereas siloxane-polyester compositions not containing (3) and (4) generally require a cure temperature of at least 200° C. to produce comparable coatings in a practicable time.

The following examples, in which the parts are expressed by weight, illustrate the invention.

EXAMPLE 1

A polyester resin (28 parts) prepared by the reaction of dimethylterephthalate, trimethylolpropane and neopentyl glycol and having 8% by weight hydroxyl groups was mixed with a low molecular weight dimethylphenylsiloxane resin (42 parts) having about 7% by weight silanol groups, cellosolve acetate (30 parts) and a transesterification catalyst and the mixture heated to 150° C. for 4 hours to provide a silicone-polyester copolymer having residual silanol and ≡COH groups. The solids content of the silicone-polyester was adjusted to 55% by the addition of further cellosolve acetate and this solution (54 parts) was then further diluted with butanol (23 parts) and ethylene glycol mono-n butyl ether (23 parts) to give an approximately 30% by weight solution of the siloxane-polyester.

The silane

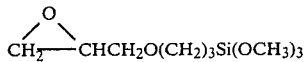

(5 parts) diisopropoxytitanium bis-(acetylacetonate) (10 parts) and n-butanol (15 parts) were mixed together and 15 g of the mixture stirred into 100 g of the silicone-polyester solution. The solution was then applied to previously degreased aluminium panels by flow coating. The coated panels were allowed to air dry for about 15 minutes at 25° C. and then placed in an oven at 180° C. for about 40 minutes.

The cured coating had a thickness of about 6 microns. When tested for solvent and abrasion resistance the coating withstood 200 double rubs with a cloth soaked in methyl ethyl ketone under an applied pressure of 595 g, and 500 rubs on the Martindale Abrasion Tester (with 595 g weight attached). The cured coating was sufficiently flexible to survive bending around a 6 mm diameter mandrel.

When placed in concentrated (36%) HCl the coated panel exhibited no sign of corrosion for at least 10 minutes. Subjection of the coated panel to the corrosion resistance test ASTM B287-62, CASS 72 hours, resulted in slight spotting of the panel.

Coated aluminium panels prepared as described above were placed in (i) an oven at 250° C. for 2½ hours, and (ii) in an oven at 200° C. for 24 hours. In both cases the silicone-polyester coatings remained clear and exhibited no yellowing.

EXAMPLE 2

To 100 parts of the siloxane-polyester resin (30% solids solution) prepared in Example 1 was added 15 parts of a mixture of the silane

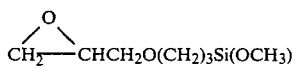

(7.5 parts), isopropoxyethoxytitanium bis-(acetylacetonate) (7.5 parts) and n-butanol (15 parts). The mixture was stirred well and applied to previously degreased aluminium panels by flow coating. The coated panels were allowed to air dry for about 15 minutes at 25° C. and then placed in an oven at 180° C. for about 30 minutes. The cured coating had a thickness of about 5 microns and H pencil hardness. When its solvent resistance was tested as described in Example 1 the coating withstood about 200 double rubs with the cloth soaked in methylethyl ketone.

That which is claimed is:

1. A composition which comprises (1) a siloxane-polyester copolymer resin having an average of at least two ≡SiOM and/or ≡COH groups per molecule, wherein M represents H or an alkyl group having from 1 to 4 carbon atoms, (2) one or more organic solvents for the siloxane-polyester copolymer (3) a silane of the general formula

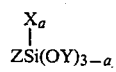

wherein Z represents an organic group composed of carbon, hydrogen and oxygen having therein at least one group of the formula

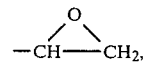

X represents a methyl group or a phenyl group, Y represents an alkyl or an alkoxyalkyl group having less than 5 carbon atoms and a has a value of 0 or 1, and (4) a titanium chelate which is a dialkoxytitanium bis-(acetylacetonate), a dialkoxytitanium bis-(ethylacetoacetate) or mixtures thereof.

2. A composition as claimed in claim 1 wherein the siloxane-polyester copolymer comprises from 35-80% by weight of siloxane and from 65-20% by weight of polyester.

3. A composition as claimed in claim 1 wherein the solvent (2) is selected from a group consisting of
   (i) lower monohydric alcohols;
   (ii) ethers of ethylene glycol;
   (iii) ethers of propylene glycol;
   (iv) mixtures of the alcohols of (i);
   (v) mixtures of the ethers of (ii);
   (vi) mixtures of the ethers of (iii) and,
   (vii) mixtures of any of (i), (ii), and (iii).

4. A composition as claimed in claim 3 which contains from 5 to 10% by weight of silane (3) and from 7.5 to 25% by weight of titanium chelate (4), both based on the weight of the siloxane-polyester (1).

5. A process for coating a substrate which comprises applying to a substrate a composition as claimed in claim 1 and thereafter curing the applied composition.

* * * * *

UNITED STATES PATENT AND TRADEMARK OFFICE
CERTIFICATE OF CORRECTION

PATENT NO. : 4,521,461

DATED : June 4, 1985

INVENTOR(S) : James McVie and Derek W. Butler

It is certified that error appears in the above-identified patent and that said Letters Patent is hereby corrected as shown below:

In column 2, line 37, the chemical equation "$\equiv$SiOH" should read --$\equiv$SiOM--.

In column 4, line 41, the first letter "C" of the word "cellosolve" should be capitalized and should read --Cellosolve--.

In column 4, line 46, the first letter "C" of the word "cellosolve" should be capitalized and should read --Cellosolve--.

Signed and Sealed this

Eighth Day of October 1985

[SEAL]

Attest:

DONALD J. QUIGG

Attesting Officer

Commissioner of Patents and Trademarks—Designate